July 29, 1969      A. STRICKLER      3,458,427
CONTINUOUS FLOW ELECTROPHORESIS APPARATUS
Filed Dec. 8, 1965      2 Sheets-Sheet 1

INVENTOR:
ALLEN STRICKLER
BY
Louis Mok
ATTORNEY

United States Patent Office 3,458,427
Patented July 29, 1969

3,458,427
CONTINUOUS FLOW ELECTROPHORESIS APPARATUS
Allen Strickler, Fullerton, Calif., assignor to Beckman Instruments, Inc., a corporation of California
Filed Dec. 8, 1965, Ser. No. 512,369
Int. Cl. B01k 5/00
U.S. Cl. 204—299                                   4 Claims

ABSTRACT OF THE DISCLOSURE

An apparatus for selecting a desired sample component band of a sample being separated by a continuous electrophoresis process including means for varying the discharge flow rate of one portion of the flowing electrolyte sheet carrying the component bands with respect to the discharge flow rate of a second portion of the electrolyte sheet to shift the electrolytic sheet in a lateral direction to bring the desired component band into alignment with a collecting device.

---

The present invention relates generally to continuous flow electrophoresis apparatus.

Electrophoresis, in general, is the phenomenon of migration of charged particles or ions in a liquid carrier medium under the influence of an electric field. This phenomenon can be used to separate small particles which, by reason of different surface chemical properties, exhibit different concentrations of surface charge in the given medium. As a result of these distinctive surface properties, the mobilities of various classes of charged particles in the carrier medium, under the influence of the electrical field, will be different.

The present invention relates in particular to what may be termed free-flow continuous flow electrophoresis, in which an electrolyte or buffer solution is made to flow freely in a uniform film or sheet. An electric potential gradient is applied to the flowing sheet at some angle to the flow, typically being perpendicular thereto. A sample continuously introduced at some point into the sheet of electrolyte flows in a narrow band in the absence of the potential gradient. When the potential gradient is applied to the sheet of electrolyte, the sample particles are separated under the influence of the electrical field into various particle groups or components depending upon the electrophoretic mobility of the respective particles, the strength of the field and the length of time the particles remain in the field. Particles of similar mobility are concentrated in distinctive zones or bands which fan out from the point of sample application.

It is desirable to collect or remove at will any selected band of particles in the electrophoretic pattern without disturbing excessively the constancy and uniformity of flow in the moving sheet. It may furthermore be desirable to remove sample components by a scanning process, that is, to collect progressively from one end of the band pattern to the other. Such a scanning process may be used, for example, to search for a suspected component or to make a relatively rapid determination of what components are present.

Accordingly, it is an object of the present invention to provide a continuous electrophoresis apparatus which permits the removal of a selected band of particles in the electrophoretic pattern with virtually no disturbance of the flowing electrolytic sheet.

It is a further object of this invention to provide a continuous flow electrophoresis apparatus in which the entire electrophoretic pattern may be scanned.

According to one specific, exemplary form or embodiment of the present invention shown and described herein, there is provided a pair of substantially flat plates fabricated of electrically insulating material disposed substantially parallel to each other in face-to-face relationship and separated from each other by gasket or spacer means sandwiched between the plates. The spacer may, for example, occupy a peripheral region between the plates and be provided with a central opening defining an interspace into which is fed a buffer solution or electrolyte. In a preferred embodiment of the invention, the electrolyte enters at a single point near the top of the interspace and exits at a plurality of discharge points in the bottom of the interspace. The interspace is shaped so that the electrolyte is subject to smooth laminar flow. The sample to be fractionated is introduced near the place of electrolyte entry and a sample component removal point is provided downstream of the sample entry point. An electric potential gradient, applied to the sheet substantially transverse to the direction of flow, causes electrophoretic separation of the sample as it moves along with the flowing sheet. By varying the flow rate of the electrolyte at each of the exits or discharge points, the sheet of electrolyte may be shifted laterally to one side or another thereby directing any desired band to the point of sample component removal.

The novel features which are believed to be characteristic of the invention are set forth with particularity in the appended claims. The invention itself, however, together with further objects and advantages thereof, can best be understood by reference to the following description taken in connection with the accompanying drawings in which:

Figure 1:
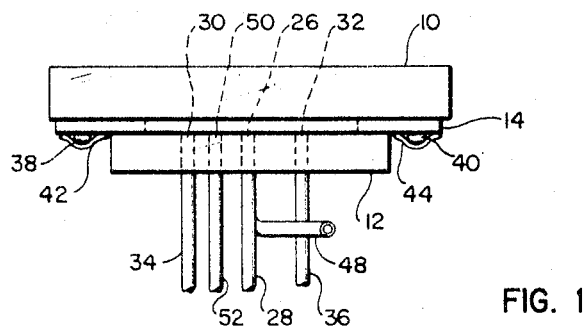
FIG. 1 is a top view of an apparatus embodying the present invention.
Figure 2:
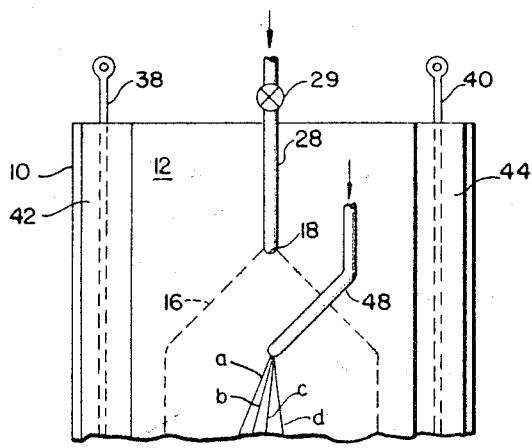
FIG. 2 is a front elevation view of the apparatus of FIG. 1.
Figure 2:
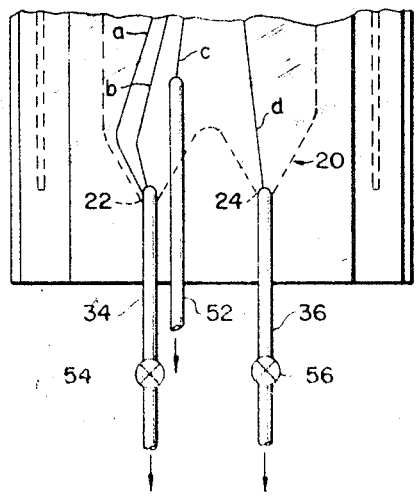
Figure 3:
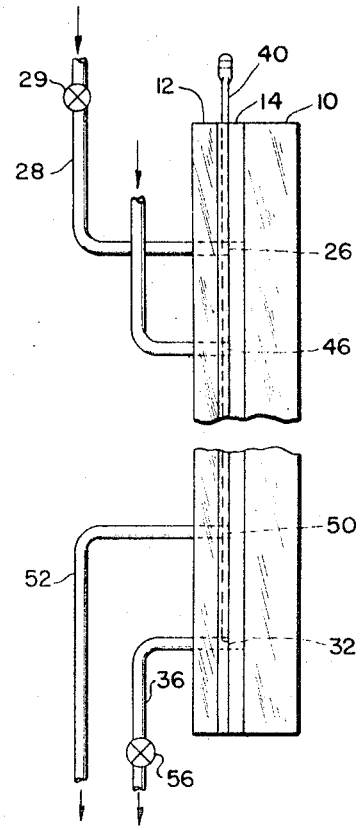
FIG. 3 is a side view of the apparatus of FIG. 1.

Turning now to the drawings, there is shown in FIGS. 1, 2 and 3 a first embodiment of the continuous flow electrophoresis apparatus of the present invention. Two flat plates, 10 and 12, suitably supported by means not shown, are held in substantially parallel face-to-face relationship and are separated by a gasket or spacer 14 sandwiched between the plates. The plates 10 and 12 may be made of glass although other materials are satisfactory. The spacer 14 is preferably fabricated of a microporous membrane material. Such material provides a separation of about 0.1 mm. between the plates 10 and 12. Plate 10 is somewhat wider than plate 12 to permit the spacer 14 to extend outwardly beyond the edges of plate 12. The purpose of this will be described below.

The spacer 14 has a centrally-located opening defining an interspace 16 between the plates 10 and 12 which serves as a conduit for the flowing electrolyte. In the embodiment illustrated in the drawings, the top portion of interspace 16 has the shape of an inverted V having an apex 18. The intermediate portion of the interspace has sides extending downwardly substantially parallel to each other. The bottom portion of the interspace is W-shaped and is designated generally by the reference numeral 20. The W-shaped portion 20 has two lower extremities 22 and 24.

Electrolyte is supplied to the interspace 16 through an inlet opening 26 located at the apex 18 of the inverted V, via a tubular element 28 supported by the plate 12. The electrolyte fans out from the apex 18 and flows in parallel lines down the intermediate rectangularly-shaped portion of the interspace 16. A valve 29 is provided in the tube 28 to control the rate of flow of the electrolyte into the interspace 16. Alternatively, constant level or constant pressure reservoir means, not shown, may serve this purpose. The flow lines, upon reaching the W-shaped bottom portion of the interspace 16, converge toward the two lower extremities 22 and 24. The electrolyte sheet is vented or withdrawn through openings 30 and 32 and corresponding discharge tubes 34 and 36. By introducing the flowing sheet of electrolyte at a single point, uniform, laminar flow is obtained. The W-shaped spacer at the bottom of the interspace 16 permits division of the flow while maintaining laminar flow conditions. If desired, more than two discharge points may be utilized by providing any number of V-shaped section across the bottom portion of the interspace 16.

Means are provided for applying an electrical potential gradient across the electrolyte sheet flowing within the interspace 16. In the embodiment shown, this is applied via the microporous spacer 14 which becomes entirely saturated with electrolyte during operation of the apparatus. The spacer 14 thus provides an electrolytic bridge whereby a D.C. voltage applied to a pair of electrodes 38 and 40 forms a potential gradient across the interspace 16. The electrodes 38 and 40 are mounted between the outwardly projecting portions of the spacer 14 and a pair of filter paper strips 42 and 44. This portion of the apparatus, not forming a part of the present invention, is described in detail in the copending application of A. Strickler, Ser. No. 465,020, filed on June 18, 1965, now abandoned entitled "Continuous Flow Electrophoresis Apparatus," and assigned to Beckman Instruments, Inc.

A sample to be fractionated is introduced or injected into the interspace 16 through a small opening 46 via a sample inlet tube 48 supported by the plate 12. A pump or gravity flow means (not shown) supplies the sample at a uniform pressure and flow rate. The sample component of interest may be removed at a point downstream of the place of sample injection, as for example, via a hole 50 and a fraction removal tube 52 which is supported by the plate 12.

Means for laterally shifting the flowing electrolyte sheet will now be described. Generally, according to the present invention, this is accomplished by controlling, at a plurality of points, the flow rate of the electrolyte leaving the interspace. The embodiment of FIGS. 2 and 3 illustrates one approach. The discharge tubes 34 and 36 are provided respectively with adjustable orifices or valves 54 and 56, which may be individually adjusted to vent more or less electrolyte from one side of the flowing sheet or the other. The effect is to shift the flow lines of the sheet toward the discharge openings which offers less resistance to flow. To maintain the total electrolyte volume flow rate at a constant level, the valves 54 and 56 may be differentially operated.

The operation of the embodiment of FIGS. 2 and 3 is as follows. The flow rate of the electrolyte entering the electrolyte inlet tube 28 is set at a desired level by adjusting the valve 29. An electric potential gradient is applied across the interspace 16 by energizing a voltage source (not shown) connected to the electrodes 38 and 40. Continuous sample injection via the inlet tube 48 and the opening 46 is then initiated. As the sample is swept along by the flowing sheet of electrolyte toward the bottom of the interspace, electrophoretic separation takes place and a plurality of zones or bands are formed in a fan-like pattern, as for example, bands *a, b, c* and *d* in FIG. 2. The path of a particular band of particles is determined by a number of factors, including the electrophoretic mobility of the particles, the strength of the electric field and the length of time the particles remain in the field. Other factors remaining constant, particles of similar electrophoretic mobility concentrate in a single band.

By adjusting the valves 54 and 56, either singly or in combination, the discharge flow rate of the electrolyte sheet may be made asymmetrical with respect to a vertical center line extending the length of the interspace 16. This shift in the sheet, either to the left or right, causes a corresponding lateral shift of the bands. It may be seen that by making appropriate adjustments of the discharge valves 54 and 56, any particular band, for example, band *c* shown in FIG. 2, may be brought into registry with the sample component removal hole 50 and thereby removed to the exclusion of all other bands.

To scan the whole particle spectrum, the settings of the valves 54 and 56 may be continuously varied. In this way, all of the bands may be continuously sampled from one extremity of the spectrum to the other.

Figure 4:
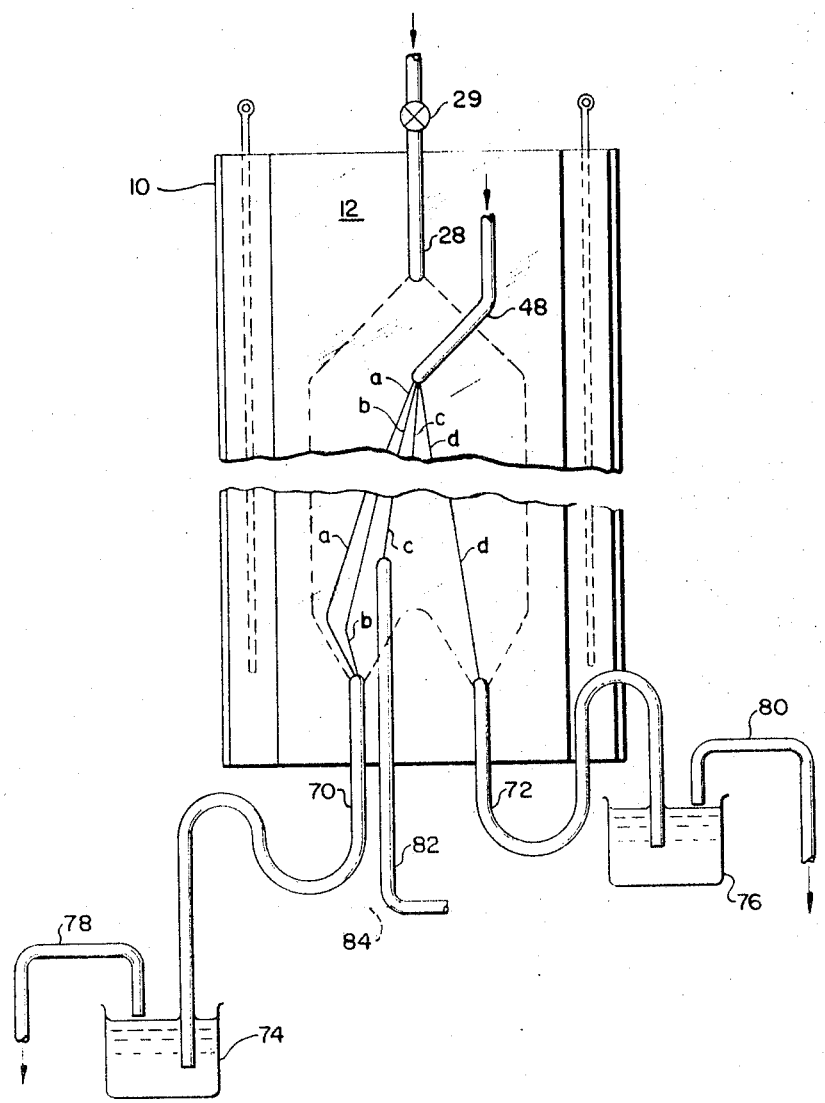
FIG. 4 is a front elevation view of an apparatus comprising an alternative embodiment of the present invention.

FIG. 4 shows another embodiment of the present invention in which an alternative approach to shifting the electrolyte sheet is utilized. The electrolyte discharges via a pair of flexible drain tubes 70 and 72 into two electrolyte reservoirs 74 and 76. The electrolyte level in each reservoir is maintained constant by means of a suitable suction pump (not shown) connected to a pair of suction tubes 78 and 80. The reservoirs may be individually raised or lowered and control of the pressure head across the flowing electrolyte sheet is thereby provided. Raising the level of a particular reservoir decreases the flow rate to that reservoir; lowering the reservoir has the opposite effect. To maintain an essentially constant electrolyte flow rate, one reservoir may be raised by the amount that the other is lowered. A sample component removal tube 82 is provided, as in the first embodiment, to remove a particular band of particles. In order to minimize disturbance of the electrolyte flow in the interspace 16, the tube 82 in the arrangement shown is preferably vented at a level 84 which is located midway between the surfaces of the electrolyte in the reservoirs 74 and 76. This venting level may have to be varied, however, depending upon the relative flow resistances of the tubes 70, 72 and 82. The entire particles spectrum may be scanned by continuously varying the levels of the reservoirs 74 and 76. Thus, while the reservoir 74 is being raised, the reservoir 76 would be lowered and vice versa.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. An apparatus for continuous electrophoresis comprising:
    a pair of substantially flat plates of electrically insulating material;
    means supporting said plates in face-to-face relationship;
    spacer means for maintaining a separation between said plates and defining an interspace therebetween;
    means for feeding an electrolyte into one end of said interspace;
    means for injecting into said interspace, at a first point located downstream of said one end, a sample to be separated into its components;
    means for applying an electric potential gradient to said electrolyte in said interspace at an angle to the direction of flow of said electrolyte freely in said interspace to separate said sample into component bands;
    means for discharging said electrolyte from said interspace, said electrolyte flowing as a laminar flow sheet in said interspace between said one end and said discharging means, said discharging means including:
        a plurality of discharge ports; and
        adjustable flow means connected to said ports for regulating the discharge rate of said electrolyte from each port to thereby laterally shift said flowing electrolyte sheet toward one side of said interspace; and means for removing a sample component from said interspace at a second point located downstream of said first point, the lateral shifting of the electrolyte sheet concurrently shifting the sample component bands carried by the electrolyte in a lateral direction permitting removal of any selected component band.

2. An apparatus as defined in claim 1 in which:

said spacer is formed of a microporous material which is saturable by said electrolyte, and said means for applying said electric potential gradient is connected to said spacer.

3. An apparatus as defined in claim 1 in which:

said opening in said spacer has an inverted V-shaped upper portion and a W-shaped lower portion, said electrolyte being fed into said interspace at the apex of said inverted V-shaped portion and discharged through said ports located in the lower extremities of said W-shaped portion;

said sample injection point is located at a point downstream of said apex; and said adjustable flow means comprise variable valves connected to said ports.

4. An apparatus as defined in claim 1 in which:

said opening in said spacer has an inverted V-shaped upper portion and a W-shaped lower portion, said electrolyte being fed into said interspace at the apex of said inverted V-shaped portion and discharged through said ports located in the lower extremites of said W-shaped portion;

said sample injection point is located at a point downstream of said apex; and said adjustable flow means comprise reservoirs connected to said ports, the height of said reservoirs being individually adjustable.

References Cited

UNITED STATES PATENTS 2,555,487    6/1951    Haugaard et al. _____ 204—180

JOHN H. MACK, Primary Examiner

A. C. PRESCOTT, Assistant Examiner

U.S. Cl. X.R.

204—180

PO-1050
(5/69)

UNITED STATES PATENT OFFICE
CERTIFICATE OF CORRECTION

Patent No. 3,458,427      Dated July 29, 1969

Inventor(s) Allen Strickler

It is certified that error appears in the above-identified patent and that said Letters Patent are hereby corrected as shown below:

Column 4, line 62, delete -- "freely" --

Column 4, line 66, insert -- freely -- after "electrolyte"--

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents